2,902,512

MANUFACTURE OF ACRYLIC ACID

Albert Verheyden, Sint Denijs Westrem, and Paul Ochsner, Uccle, Brussels, Belgium, assignors to Union Chimique Belge, S.A., Brussels, Belgium, a corporation of Belgium No Drawing. Application August 19, 1957
Serial No. 679,082

Claims priority, application Belgium August 31, 1956

2 Claims. (Cl. 260—526)

The present invention relates to the production of acrylic acid by catalytic decarboxylation of maleic acid.

It is known that dicarboxylic acids can be decarboxylated at temperatures between 300° and 450° C. by passing their vapours over catalysts, such as artificial zeolites and oxides, carbonates and silicates of various metals. Generally speaking, these catalysts are particularly suitable for the decarboxylation of phthalic anhydride to give benzoic acid.

Thus, a catalyst containing zinc aluminium oxides and sodium silicate is used for obtaining benzoic acid from phthalic acid in yields higher than 90%. This same catalyst results in a yield of only 30% of acrylic acid, when maleic acid is used as the starting material.

Artificial zeolites containing copper are most suitable for the decarboxylation of maleic acid. Experience has shown that such catalysts rapidly lose their activity during the reaction. It is also known that this activity is increased when the decarboxylation is carried out in a reducing atmosphere.

The present invention concerns the decarboxylation of maleic acid to give acrylic acid using a catalyst giving better yields than those hitherto obtained by catalytic decarboxylation. This catalyst does not lose its activity during the catalysis. It contains, in a critical ratio, silica, copper oxide and a barium compound. The quantity of copper oxide is between 5% and 30% and preferably 10% by weight of the silica used. The quantity of barium is between 1% and 50%, preferably 10%, calculated on the weight of the copper present in the form of oxide.

Iron-free colloidal silica is advantageously used. It is also possible to use silica in the form of pumice stone or other supports. However, the activity of the catalysts thus prepared decreases during the decarboxylation.

The copper oxide is freshly precipitated from an aqueous solution of a copper salt, since a previously dried copper oxide or a commercial copper oxide is unsuitable.

The barium is added in the form of a water-insoluble salt, the naphthenate or the carbonate being more particularly used. Experience has shown that catalysts prepared from ionized barium salts rapidly loose their activity.

It is to be noted that the order of introduction of the various constituents of the catalyst does not influence the yields.

For preparing the catalyst in accordance with the present invention, a copper oxide may be mixed with sodium silicate before the silica and the barium compound are added thereto.

With the catalysts hitherto used for decarboxylating maleic acid, the decarboxylation is carried out in an inert or even reducing atmosphere. We have found that the catalyst of the present invention requires an oxidizing atmosphere during the decarboxylation which takes place in an atmosphere containing from 0.5% to 8% of oxygen. An excess of steam over the starting quantity of maleic acid is also essential. The ratio of the weights of water and maleic acid is preferably of about 2:1.

The decarboxylation temperature is between 200° and 300° C., that is to say, very much lower than the usual temperatures for the same reaction. The best results are obtained by operating between 240° and 260° C.

The space velocity, that is to say, the ratio $$\frac{\text{gas delivery in liters per hour}}{\text{catalyst volume in liters}}$$

varies between 200 and 500, and generally between 350 and 400.

The acrylic acid is obtained as an aqueous, limpid, yellow solution containing about 40% of crude acrylic acid and also unconverted maleic acid. The separation and the purification are carried out in accordance with known methods. The glacial acrylic acid finally obtained represents about 80% of the acid contained in the solution recovered during the catalytic decarboxylation. To improve the yield, the addition of polymerization inhibitors is recommended. Obviously, the methods of purifying the crude acid are not a critical part of the invention.

In all the examples, we have used a maleic acid solution obtained from 2500 g. of maleic anhydride and 5 liters of water. Other tests which are not included in the examples have shown that substantially the same results are obtained when the ratio of water to maleic acid is between 1.5 and 3:1.

Example 1

For the preparation of the catalyst, six steps are necessary:

(a) 200 parts by weight of iron-free colloidal silica ("Aerosil" Degussa) are placed in suspension in 2000 parts of distilled water.

(b) 62.8 parts by weight of copper sulphate $$(CuSO_4.5H_2O)$$

corresponding to 20 parts of copper oxide are dissolved under heat in 6000 parts of distilled water. There is added thereto, at the boiling point, a 10% sodium hydroxide solution to produce a pH of 8. The mixture is boiled for 10 minutes, decanted and the copper oxide is filtered off through a Buchner funnel. The precipitate can be washed, but the yields of the catalysis are the same without washing.

(c) A barium naphthenate solution is prepared by neutralizing 16 parts of crude naphthenic acid with about 1.6 parts of sodium hydroxide in a 10% aqueous solution. The pH is adjusted to 8. The aqueous sodium naphthenate solution is added to a boiling aqueous solution of 6.2 parts by weight of barium chloride ($BaCl_2.2H_2O$), this quantity corresponding to 10% of barium calculated on the copper used under (b). At the end of the precipitation of the barium naphthenate a persistent foam appears. The product is decanted and washed twice with water and the viscous precipitate is dissolved in hot benzene.

(d) The barium naphthenate solution in benzene is added with constant agitation to the copper oxide paste obtained under (b) and the two phases are intimately mixed until a homogeneous mass is obtained.

(e) The suspension of colloidal silica obtained under (a) is slowly added and intimately mixed with the mass obtained under (d).

(f) The pasty mixture is dried for 12 hours at 180° C. A dark brown solid is obtained, which is crushed and screened to produce grains having a diameter of about 5 mm.

A mixture of water and maleic acid vapors obtained from the stock aqueous maleic acid solution is mixed with 1.7% oxygen by volume.

The mixture is preheated at about 240° C. and passed over the catalyst prepared as described above at a space velocity of 365. The decarboxylation takes place at 240–250° C.

An aqueous solution containing the acrylic acid resulting from the decarboxylation and the unreacted maleic acid is obtained. To separate these acids, the solution is steam distilled. An aliquot part of the distillate is titrated. The conversion yield is 62%. Taking into account the maleic acid recovered, an effective yield of 78.3% was obtained. This yield is maintained substantially during the hundred hours of the experiment.

To obtain glacial acrylic acid, the crude acrylic acid solution is evaporated in the presence of an excess of benzene and of a polymerization inhibitor (for example hydroquinone or copper sulfate). The vapors contain about 10% of acrylic acid which can be recovered. When all the water is distilled, the product is allowed to cool. The maleic acid, which crystallizes almost quantitatively from benzene, may be separated by filtration. The benzene and then the acrylic acid are distilled in vacuo. The glacial acrylic acid is recovered in a yield of 80% calculated on the acrylic acid present in the initial aqueous solution. Finally, a distillation residue is obtained which consists of polymerized acrylic acid.

Example 2

The catalyst of Example 1 is used under the conditions of Example 1 with the exception of the space velocity, which is reduced to 280.

The conversion is 62.5% and the effective yield 68.7%.

Example 3

The preparation of the catalyst described in Example 1 is modified in the following manner: 27.2 parts by weight of technical sodium silicate (40° Bé.) are added to the copper oxide prepared under (b). By intimate mixing, a paste is obtained which is thereafter mixed with the benzenic barium naphthenate solution as described under (d). The other steps of the preparation of the catalyst remain unchanged.

Under the same conditions as those described in Example 1, an aqueous maleic acid solution is converted into an aqueous solution of acrylic and maleic acids. The conversion is 56% and the effective yield 70.5%.

Example 4

In the preparation of the catalyst of Example 4 no barium naphthenate is added to the copper oxide. The catalyst is therefore composed of a mixture of sodium silicate, copper oxide and silica.

Under the same conditions as those described in Example 1, the conversion is 74.2% and the effective yield 82.2%. However the activity of the catalyst decreases rapidly: after 5 hours reaction, the conversion yield only reaches 30%. A regeneration of the catalyst is possible by heating it at 280° C. in a current of oxygen. The catalyst thus regenerated has only a transient activity.

Example 5

In the catalyst prepared in Example 1, the barium naphthenate is replaced by barium nitrate in the same proportions by weight of barium. A catalyst is obtained which, under the same operating conditions as those described in Example 1, gives a conversion of 27.6% and an effective yield of 75%. This catalyst loses its activity after 10 hours reaction.

Example 6

The colloidal silica "Aerosil" used in Example 1, is replaced by the colloidal silica "Santocel" containing traces of iron.

Under the same conditions as those described in Example 1, an aqueous maleic acid solution is converted into an aqueous acrylic acid solution. The conversion is 38.7% and the effective yield 63.5%. However, the activity of the catalyst decreases rapidly.

Example 7

Copper oxide is prepared from 62.8 parts by weight of copper sulphate ($CuSO_4.5H_2O$) in accordance with the indications of paragraph (b) of Example 1.

27.2 parts by weight of technical sodium silicate (40° Bé.) are intimately mixed therewith. The paste thus obtained is mixed in accordance with (d) with the barium naphthenate prepared in accordance with (c). The mixture is thereafter poured over 1000 parts by volume of pumice stone.

Under the operating conditions of Example 1, this catalyst gives a conversion of 64% and a yield of 76.8%, but its activity is limited in time.

Example 8

A catalyst containing copper oxide and barium carbonate was prepared as follows:

(a) 200 parts by weight of iron-free colloidal silica "Aerosil" are placed in suspension in 2000 parts of distilled water.

(b) 61 parts by weight of copper nitrate $$[Cu(NO_3)_2.3H_2O]$$

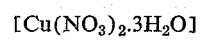

corresponding to 20 parts of copper oxide are dissolved under heat in 6000 parts of distilled water. There is added thereto, at the boiling point, a 10% sodium hydroxide solution to produce a pH value of 8. To this suspension is added, under agitation, a concentrated aqueous solution of 7.8 g. of barium nitrate and thereafter a solution of 3.2 g. of sodium carbonate to precipitate the barium carbonate. The mass is boiled for 10 minutes and the precipitate containing copper oxide and barium carbonate is centrifuged.

(c) The colloidal silica suspension obtained under (a) is slowly added and then intimately mixed with the mixture obtained under (b).

(d) This paste is dried for 12 hours at 180° C. A blackish solid is obtained, which is crushed and screened so as to produce grains of a diameter of about 5 mm.

An aqueous maleic acid solution is reacted under the conditions of Example 1 and the acrylic acid is obtained with a conversion of 69% and in an effective yield of 72%. This yield is maintained for more than 30 hours.

We claim:

1. A process for the preparation of acrylic acid by decarboxylating maleic acid comprising contacting at a space velocity from 200 to 500 and at a temperature from 200 to 300° C. a mixture of 1.5 to 3 parts by weight of water vapor, 1 part by weight of maleic acid vapor and a quantity of gaseous oxygen equal to 0.5 to 8 parts by volume, based on 100 parts by volume of vapors, with a catalyst comprising a mixture of about 10 parts by weight of freshly precipitated copper oxide, about 100 parts by weight of colloidal iron-free silica, a water-insoluble barium salt selected from the group consisting of barium carbonate and barium naphthenate, the barium content of said salt being about 10% by weight of the copper present in the form of oxide, and from 0 to 20 parts by weight of sodium silicate.

2. A process for the preparation of acrylic acid by decarboxylating maleic acid comprising contacting at a space velocity from 200 to 500 and at a temperature from 200 to 300° C. a mixture of 1.5 to 3 parts by weight of water vapor, 1 part by weight of maleic acid vapor and a quantity of gaseous oxygen equal to 0.5 to 8 parts by volume, based on 100 parts by volume of vapors, with a catalyst comprising a mixture of 5 to 30 parts by weight of freshly precipitated copper oxide, about 100 parts by weight of colloidal iron-free silica, a water-insoluble barium salt selected from the group consisting of barium carbonate and barium naphthenate, the barium content of said salt being from 1 to 50% by weight of the copper present in the form of oxide, and from 0 to 20 parts by weight of sodium silicate.

References Cited in the file of this patent

UNITED STATES PATENTS

| | | |
|---|---|---|
| 1,953,232 | Jaeger | Apr. 3, 1934 |
| 1,964,516 | Jaeger | June 26, 1934 |